United States Patent [19]

Robertiello et al.

[11] Patent Number: 4,604,125

[45] Date of Patent: Aug. 5, 1986

[54] SOLID COMPOSITION OF ORGANIC FERTILIZER AND OF ORGANO-MINERAL FERTILIZER

[75] Inventors: Andrea Robertiello, Rome; Leonello Angelini, Monterotondo, both of Italy

[73] Assignee: Eni-Ente Nazionale Idrocarburi, Rome, Italy

[21] Appl. No.: 619,038

[22] Filed: Jun. 11, 1984

[30] Foreign Application Priority Data

Jun. 15, 1983 [IT] Italy ................ 21633 A/83

[51] Int. Cl.⁴ .............................................. C05F 5/00
[52] U.S. Cl. ............................. 71/26; 426/54; 71/28; 71/31; 71/34
[58] Field of Search ............ 71/26; 426/54, 636

[56] References Cited

U.S. PATENT DOCUMENTS 3,983,255  9/1976  Bass ................................... 426/54
4,069,033  1/1978  Baldassari ........................ 71/26 X
4,273,659  6/1981  Robertiello et al. ............ 210/728

FOREIGN PATENT DOCUMENTS 0033254  8/1981  European Pat. Off. ............... 71/26

Primary Examiner—Ferris H. Lander
Attorney, Agent, or Firm—Hedman, Gibson, Costigan & Hoare

[57] ABSTRACT

There is provided a solid composition of an organic fertilizer which is the solid product obtained by desalting a vinasse with phosphoric acid in the presence of ethanol. The product contains at least 1.5% of nitrogen, at least 4% of $P_2O_5$, at least 5% of $K_2O$ and at least 8% of carbon. Another composition, this one comprising a mixture of the foregoing with one or more inorganic or organic nitrogen, phosphorus or potassium compounds to yield a complex organo-mineral fertilizer, is also described.

2 Claims, No Drawings

SOLID COMPOSITION OF ORGANIC FERTILIZER AND OF ORGANO-MINERAL FERTILIZER

FIELD OF THE INVENTION

The present invention relates to a composition of organic fertilizer and to a composition of complex organo-mineral fertilizer, such composition being water soluble, as well as to a process for preparing such compositions.

BACKGROUND OF THE INVENTION

The U.S. Pat. No. 4,273,659 granted on June 16, 1981, describes and claims a process for the desalting of the effluents of the industrial fermentation processes of the sugars, by means of the treatment of such effluents with a mineral or organic acid, in the presence of a relatively volatile organic solvent.

This process is mainly applied for selectively precipitating the potassic salts from the vinasses of beet molasses, which, deprived of the most of the potassium contained therein, are a valuable component for fodders, mainly intended for polygastric cattle, as it is described in the U.S. patent application Ser. No. 343,465 filed on Jan. 28, 1982, now U.S. Pat. No. 4,479,978 granted on Oct. 30, 1984.

According to the U.S. Pat. No. 4,273,659 granted on June 16, 1981 mentioned above, the desalting of the molasses is carried out by means of one of the following acids: sulphuric, nitric, hydrochloric, chloric, perchloric, iodic, chromic, tartaric and oxalic. The present invention is essentially based on the observation that the products from the desalting, by means of phosphoric acid, and in the presence of an organic solvent, of the effluents from the fermentation of the sugars, in addition to exhibiting a high titre of phosphorous and potassium, are free from phytotoxic substances, and moreover contain relatively large quantities of other mineral elements, as well as of useful organic substances, which pass through the fermentation processes and the desalting process, unchanged or practically unchanged. Consequently, according to the present invention, such solid products from the desalting are by themselves valuable compositions of organic fertilizers, or valuable components of compositions of complex organo-mineral fertilizers, when integrated with at least one organic or inorganic nitrogen bearing compound.

Accordingly, the present invention relates to a solid composition of organic fertilizer, consisting of the solid product from the desalting with phosphoric acid and in the presence of an organic solvent, of an effluent from the industrial fermentation processes of the sugars (vinasse). Such a composition generally contains a quantity of organic nitrogen of at least 1.5% by weight, a quantity of phosphorous (as $P_2O_5$) of at least 4% by weight, a quantity of potassium (as $K_2O$) of at least 5% by weight, and a content of organic carbon of at least 8% by weight.

According to another feature, the present invention relates to a solid composition of complex organo-mineral fertilizer, comprising the solid composition of the above organic fertilizer, and at least one organic or inorganic compound bearer of nitrogen. Such a composition of complex organo-mineral fertilizer has conveniently a total nitrogen content of at least 3% by weight, the organic nitrogen, phosphorous, potassium and organic carbon contents being as shown with reference to the solid composition of organic fertilizer. The raw materials which can be suitably used for preparing the solid composition of organic fertilizer according to the present invention, are the effluents from the industrial fermentation of sugars, such as for, instance, the effluents from the industrial fermentation of the molasses or more generally of sugary solutions obtained by means of extraction processes from plants such as the sugar beet, the sugar cane, and the sugar sorghum. Such effluents are generally given the name of "vinasses". Also useful as suitable raw materials are other effluents from the industrial fermentation of sugars, such as for example the residues from the production of citric acid, glycerine, glutamic acid, lactic acid, butyl alcohol and acetone and of antibiotic substances. All of these are useful, on the basis of the observation that the fermentation processes, which make use of sugary extracts from plants, are active on the carbohydrates contained in the raw material, at the same time leaving practically unchanged in the effluents the quantities of minerals and proteins which were initially contained in them.

In the following disclosure all the raw materials which have been hereinbefore described shall be referred to as "vinasses".

According to an object of the present invention, a vinasse containing from 40% to 65% by weight of dissolved solids, and preferably from 50% to 60% by weight of such solids, is treated with phosphoric acid. Preferred for use is concentrated phosphoric acid, e.g., the phosphoric acid with a specific gravity of 1.69 kg/l. It is, however, possible as well to use diluted aqueous phosphoric acid, even if it generally preferable not to reduce its specific gravity to less than about 1.50 kg/l. The quantity of the phosphoric acid to be added to the vinasse is a function of the titre of potassium in the vinasse itself. A quantity of solution of phosphoric acid is generally used of from 2.7 to 3.4 kg per each kilo of potassium in the vinasse. The contact between the vinasse and the phosphoric acid takes place suitably in a closed reaction vessel, equipped with stirring means. A fundamental feature of the present invention is that the desalting stage of the vinasse is carried out in the presence of an organic solvent, which is soluble in the reaction medium, and is inert towards the other components of the reaction mixture. Organic solvents suitable to this purpose are the lower aliphatic alcohols (mainly methanol and ethanol) and the ketones (mainly acetone and methyl-ethyl-ketone). Among all of these products, ethanol is the most preferred, in that it has a low toxicity, and is available in large quantities at low cost.

It is not necessary that the organic solvent be anhydrous, and moreover the quantity of such solvent is not critical, even if it is convenient to use it in a quantity within the range from 10 to 25 parts by volume per 100 parts by volume of the vinasse.

In the preferred embodiments of the invention, phosphoric acid is added to the vinasse, which is being stirred in a closed reactor. After some minutes (e.g., 10 minutes) the organic solvent is added to the charge being stirred. After a further time of from 60 to 90 minutes, the stirring is discontinued and the precipitated solids are separated, e.g. by centrifuging. All of the above described operations are effected at room temperature (20°–25° C.), or at a temperature close to the room temperature.

The precipitated solid is then submitted to a drying operation, which is suitably effected at temperatures not higher than 130° C., and possibly under a lower than atmospheric pressure.

The solid composition of organic fertilizer according to the present invention is thus obtained, which contains primary chemical elements conducive to fertility, and more particularly, potassium and nitrogen, secondary elements, such as calcium, magnesium and sulphur, and micro elements, such as manganese, zinc, copper, boron and iron. In the composition are also present organic substances, which confer to it a high titre of organic product from biological origin, and also aminoacids are present, which are bearers of organic nitrogen.

More particularly, when vinasses from the distillation of beet molasses are used, a composition can be obtained of organic fertilizer with a potassium content which is typically of the order of 10% by weight, with a content of phosphates which is tipically of the order of 15% by weight, with a content of organic carbon of the order of 20–35% by weight, and with a content of non ammoniacal nitrogen of the order of 5–5.5% by weight.

The solid composition of complex organo-mineral fertilizer according to the present invention is prepared by mixing the solid composition of organic fertilizer hereinbefore described, with at least one organic or inorganic compound bearer of nitrogen. If desirable, of course, there may also be added one or more compounds which contain phosphorous and/or potassium. Examples of such compounds are the compounds from the classes of urea, nitrates, ammonium salts, superphosphates such as supertriple, phosphoric acid and its salts, potassium chloride and potassium sulphate.

Obviously the quantities of the components in the solid composition of complex organo-mineral fertilizer, are determined in view of the nature of such components as well as of the titre of nitrogen, potassium and phosphorous desired for the composition itself.

An advantageous characteristic of the present invention is indeed the fact that it is possible to obtain a solid composition of complex organo-mineral fertilizer with a constant and pre-determined titre of nitrogen, phosphorous and potassium, even by using, as the raw material, the effluents from the industrial fermentation of the sugars, whose chemical characteristics are not constant.

In any case, the solid compositions of fertilizer according to the present invention are water-soluble and exhibit the characteristics of good fertilizers, not only from the chemical viewpoint, but also because their components which derive from exclusively vegetable raw materials, have preliminarily been submitted to treatments of essentially biological character, and are therefore absolutely free from phytotoxic substances.

An advantage of the use of the composition of fertilizer according to the present invention, is that a part of the fertilizing elements which have been withdrawn from the soil during vegetative cycle of the sugar plants, can be recovered and recycled as fertilizer again; this all, at the same time solving the pollution problems deriving from the effluents of the industrial fermentation processes.

DESCRIPTION OF THE SPECIFIC EMBODIMENTS

The experimental examples which are shown hereunder, are illustrative of, and not to be considered in any way limitative of the invention.

EXAMPLE 1

In a closed reaction vessel equipped with stirring means, containing 250 kg of vinasses from the distillation of beet molasses, such vinasses having been concentrated to a content of 59% of dissolved solids, 27.2 kg of phosphoric acid are added (concentrated, specific gravity 1.55 kg/l) and, after some minutes of stirring, 33 kg of aqueous ethanol (specific gravity 0.82 kg/l) are added. After about one hour of slow stirring, the the resulting precipitated matter is separated by means of a basket centrifuge, sent to a drying oven operating at 80° C. under vacuum, and weighed. 84.9 kg of a product are thus obtained, which will be below referred to as "phosphopotassic saline", is submitted to chemical analysis, results of which are shown in Table 1, in which the percentages are expressed as % based on the weight of dried matter.

TABLE 1

| | |
|---|---|
| Ashes | 40.72 |
| Organic matter | 59.28 |
| Total nitrogen | 5.80 |
| Ammoniacal nitrogen | 0.22 |
| Organic carbon | 32.54 |
| Hydrogen | 4.89 |
| Potassium | 9.52 |
| Magnesium | 2.13 |
| Phosphates | 14.12 |

The so obtained phospho-potassic saline has therefore a titre $N:P_2O_5:K_2O:MgO$ of 5.5:10.5:11.5:3.5. This phospho-potassic saline is used as a component in the formulation of organo-mineral fertilizers with different titres of N, $P_2O_5$ and $K_2O$. More perticularly, in a mixer-granulation mill the substances are added to the phospho-potassic saline, which are shown in the Table 2 below.

The mixtures, homogenized and granulated, are examples of organo-mineral fertilizers according to the present invention.

TABLE 2

| (a) Organo-mineral fertilizer for orchards 10-10-10-3 | | | | | |
|---|---|---|---|---|---|
| Components ($N:P_2O_5:K_2O:MgO$) | (%) | N (%) | $P_2O_5$ (%) | $K_2O$ (%) | MgO (%) |
| Phospho-potassic saline (5.80:10.55:11,42:3.54) | 83 | 5.10 | 9.28 | 10.04 | 3.12 |
| Urea (46:0:0:0) | 10 | 4.60 | — | — | — |
| $(NH_4)_2PO_4$ (18:46:0:0) | 2 | 0.36 | 0.92 | — | — |
| | 100 | 10.06 | 10.20 | 10.04 | 3.12 |

| (b) Organo-mineral fertilizer for the manuring of market gardens 14-8-9. | | | | |
|---|---|---|---|---|
| Components ($N:P_2O_5:K_2O$) | (%) | N (%) | $P_2O_5$ (%) | $K_2O$ (%) |
| Phospho-potassic saline (5.8:10.55:11.42) | 79 | 4.58 | 8.33 | 9.02 |
| Urea (46:0:0) | 21 | 9.66 | — | — |
| | 100 | 14.24 | 8.33 | 9.02 |

| (c) Organo-mineral fertilizer for the manuring of the wheat and of the beet 9-20-8 | | | | |
|---|---|---|---|---|
| Components ($N:P_2O_5:K_2O$) | (%) | N (%) | $P_2O_5$ (%) | $K_2O$ (%) |
| Phospho-potassic saline (5.8:10.55:11.42) | 72 | 4.17 | 7.59 | 8.22 |
| $(NH_4)_2HPO_4$ (18:46:0) | 28 | 5.04 | 12.88 | — |

TABLE 2-continued

| | | | |
|---|---|---|---|
| 100 | 9.21 | 20.97 | 8.22 |

EXAMPLE 2

In a closed reaction vessel, equipped with stirring means, containing 250 kg of vinasses from the distillation of beet molasses, concentrated to a dissolved solids content of 59%, 27.2 kg of concentrated phosphoric acid (specific gravity 1.55 kg/l) are added and, after some minutes of stirring, 36 kg of aqueous ethanol (specific gravity 0.82 kg/l) are added. After about one hour of slow stirring, the precipitate which has been obtained is separated by centrifugation by using a basket centrifuge. The moist product (174.7 kg with 48.6% dry matter) is introduced into a second reactor and admixed with 42 kg of aqueous ethanol (specific gravity 0.82 kg/l). After some minutes of rapid stirring, the precipitate is separated by centrifuging and sent to a drying-granulator mill, operating under atmospheric pressure and equipped with a device for the recovery of the condensate.

57.9 kg of a granulated product are thus obtained, whose chemical composition is shown in Table 3, in which the percentages are expressed as % by weight based on the dried matter.

TABLE 3

| | |
|---|---|
| Ashes | 59.40 |
| Organic matter | 40.60 |
| Total nitrogen | 5.43 |
| Ammoniacal nitrogen | 0.37 |
| Organic carbon | 22.45 |
| Hydrogen | 3.11 |

TABLE 3-continued

| | |
|---|---|
| Potassium | 10.47 |
| Magnesium | 2.6 |
| Phosphates | 16.10 |

The phospho-potassic saline thus obtained has therefore a titre of $N:P_2O_5:K_2O:MgO$ of 5.5:12:12.5:4.

By integrating this phospho-potassic saline formulations of organo-mineral fertilizers are obtained, similar to those shown in the preceeding Example.

We claim:

1. A solid composition of organic fertilizer, comprising the solid product obtained from the desalting of a vinasse, said desalting having been conducted by contacting the vinasse having a solids content of 45 to 65% by weight with an acid consisting of phosphoric acid having a specific gravity from 1.50 to 1.69 kg/l in an amount from 2.7 to 3.4 kg per kilogram of potassium in the vinasse, in an organic solvent consisting essentially of ethanol, the ethanol being present in an amount from 10 to 25 parts by volume per 100 parts by volume of the vinasse, said solid product containing a quantity of organic nitrogen of at least 1.5% by weight, a quantity of phosphorous expressed as $P_2O_5$ of at least 4% by weight, a quantity of potassium expressed as $K_2O$ of at least 5% by weight, and a quantity of organic carbon of at least 8% by weight.

2. A composition of a complex organo-mineral fertilizer comprising a mixture of the solid desalting product of claim 1 and at least one organic or inorganic nitrogen-containing compound and optionally an additional compound selected from among phosphorous compounds, potassium compounds and mixtures of phosphorous and potassium compounds, said mixture having a nitrogen content of at least 3% by weight.

* * * * *